(12) United States Patent
Makkonen

(10) Patent No.: US 6,396,935 B1
(45) Date of Patent: May 28, 2002

(54) HEADSET AND METHOD FOR A HEADSET

(76) Inventor: Veijo Sakari Makkonen, Tierantie 4 A 2, FIN-04230 Kerava (FI)

( * ) Notice: Subject to any disclaimer, the term of this patent is extended or adjusted under 35 U.S.C. 154(b) by 0 days.

(21) Appl. No.: 09/117,038
(22) PCT Filed: Jan. 24, 1997
(86) PCT No.: PCT/FI97/00038
   § 371 Date: Jul. 23, 1998
   § 102(e) Date: Jul. 23, 1998
(87) PCT Pub. No.: WO97/27721
   PCT Pub. Date: Jul. 31, 1997

(30) Foreign Application Priority Data

Jan. 26, 1996 (FI) .................................................. 960358

(51) Int. Cl.[7] .................................................. H04R 1/02
(52) U.S. Cl. ..................... 381/334; 381/373; 381/381; 379/430
(58) Field of Search .................. 381/373, 374, 381/375, 381, 333, 74, 309, 370; 379/430

(56) References Cited

U.S. PATENT DOCUMENTS

| | | | |
|---|---|---|---|
| 3,862,378 A | * | 1/1975 | Norris |
| 4,020,297 A | * | 4/1977 | Brodie ........................ 379/430 |
| 4,090,042 A | * | 5/1978 | Larkin |
| 4,273,969 A | * | 6/1981 | Foley et al. |
| 4,617,431 A | * | 10/1986 | Scott et al. |
| 4,864,610 A | * | 9/1989 | Stevens |
| 5,210,792 A | * | 5/1993 | Kajihara |
| 5,590,417 A | * | 12/1996 | Rydbeck |
| 5,757,944 A | * | 5/1998 | Jensen et al. ................ 379/430 |

FOREIGN PATENT DOCUMENTS

| | | | |
|---|---|---|---|
| DE | 31 20013 A1 | * | 3/1982 |
| DK | 167133 B1 | | 12/1992 |
| EP | 0 396 300 A3 | * | 11/1990 |
| EP | 0 690 654 A2 | * | 1/1996 |
| FI | 2020 | * | 7/1995 |
| GB | 2 271 689 A | * | 4/1984 |
| GB | 2 239 162 A | * | 6/1991 |

* cited by examiner

*Primary Examiner*—Ping Lee
(74) *Attorney, Agent, or Firm*—Arent Fox Kintner Plotkin & Kahn, PLLC

(57) ABSTRACT

The present invention is a headset having a microphone and a speaker mounted on an essentially deformable boom. The deformable boom provides a selectively deformable ear loop portion that is adjustable to custom fit individual forms of an auricle of a user. The speaker is located near the ear canal opening to allow the user to hear surrounding sound. Communication interface is located within the boom for transmitting a voice signal. A transceiver is provided to be located within the boom or separately.

12 Claims, 4 Drawing Sheets

Figure 5:
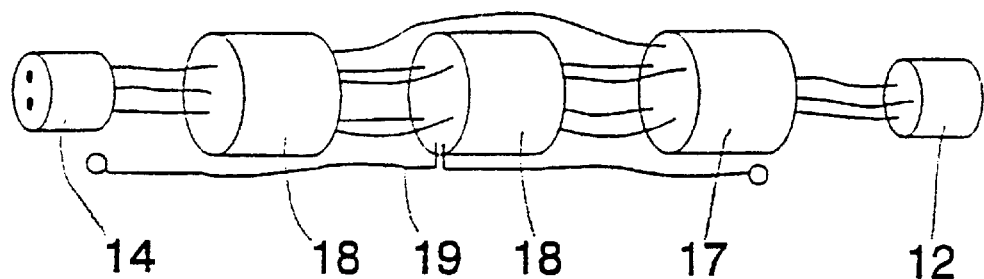

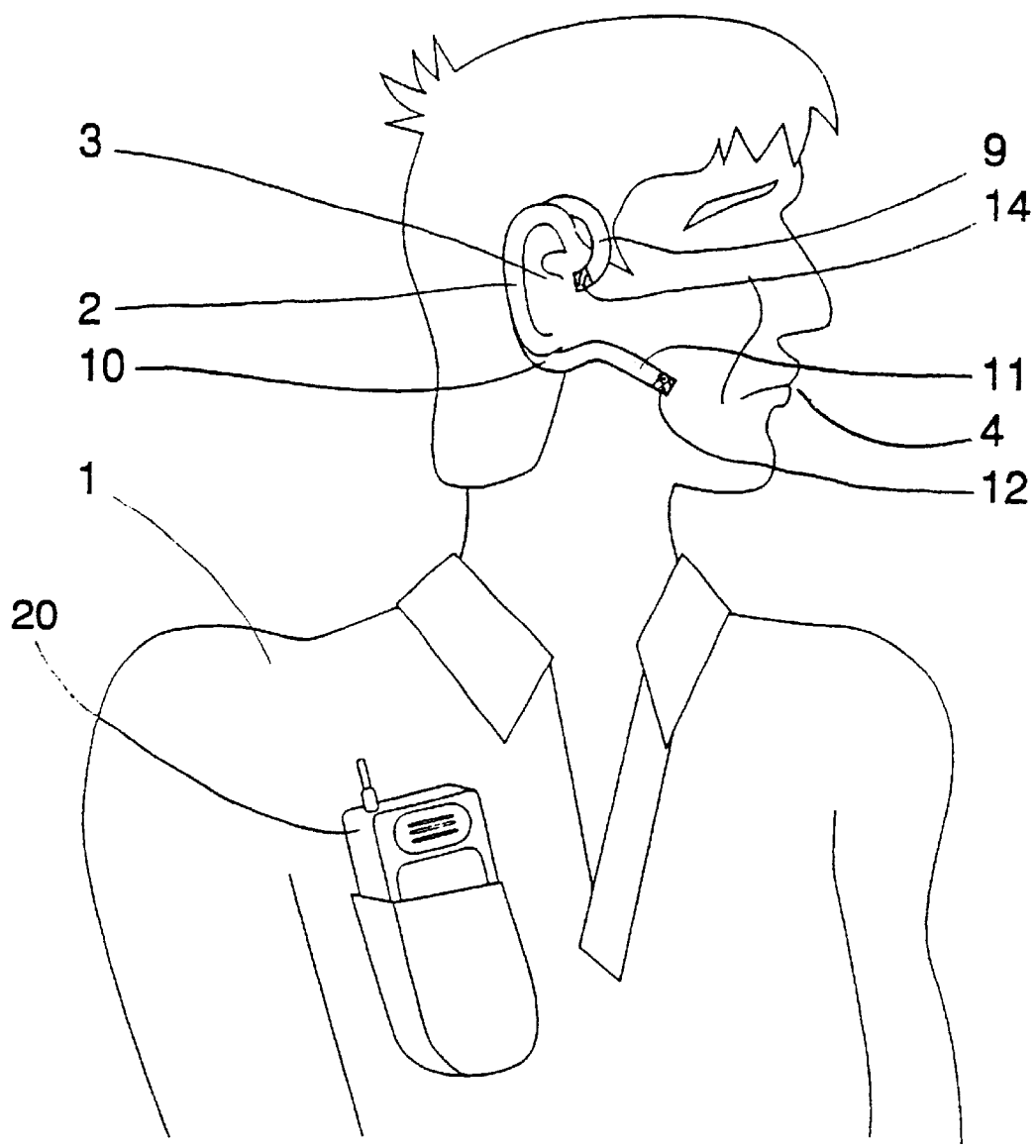
Fig 1
Fig 2
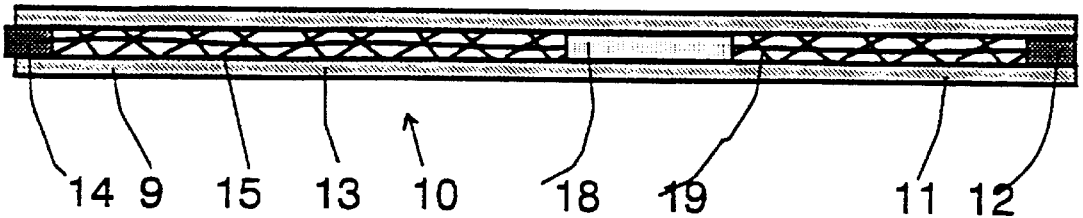

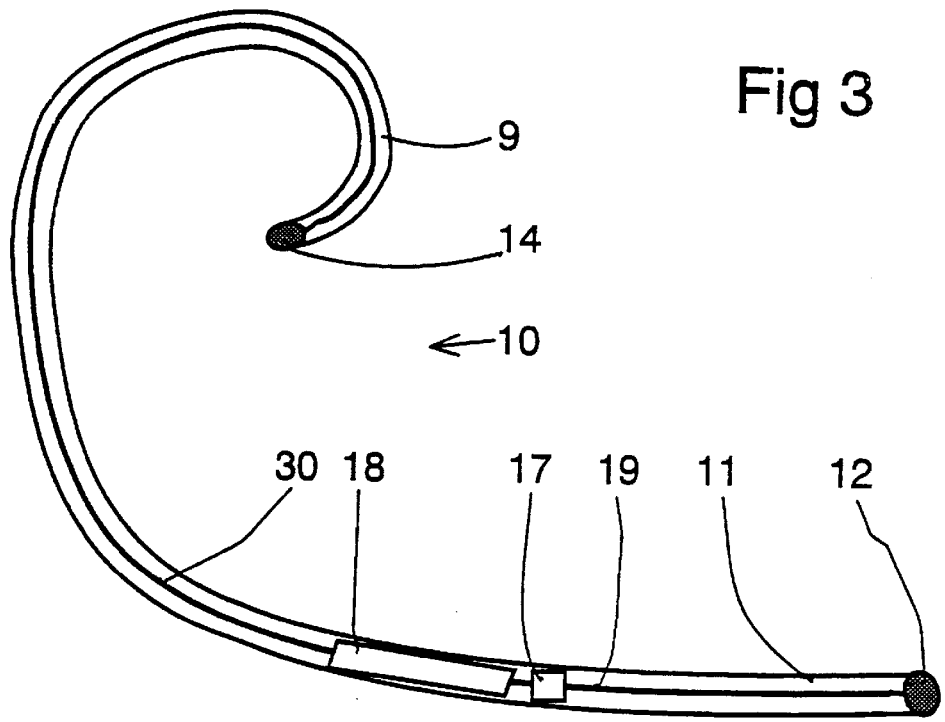
Fig 3
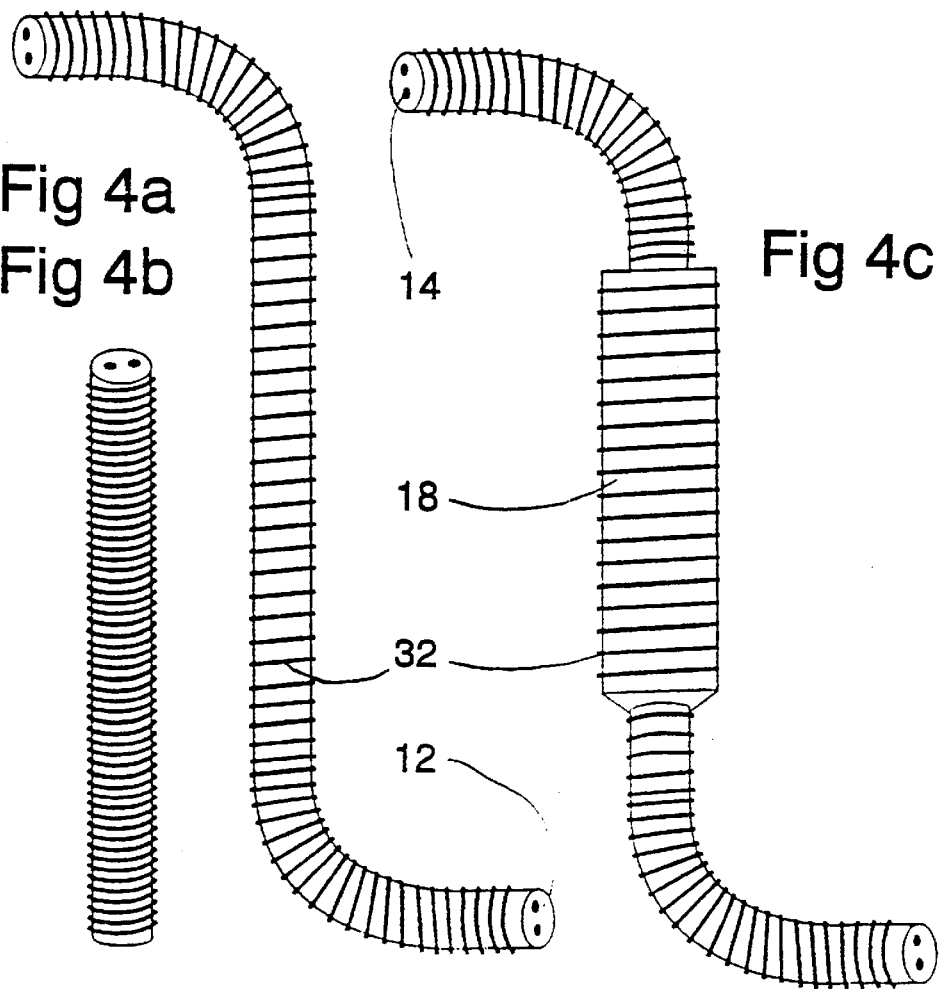
Fig 4a
Fig 4b
Fig 4c

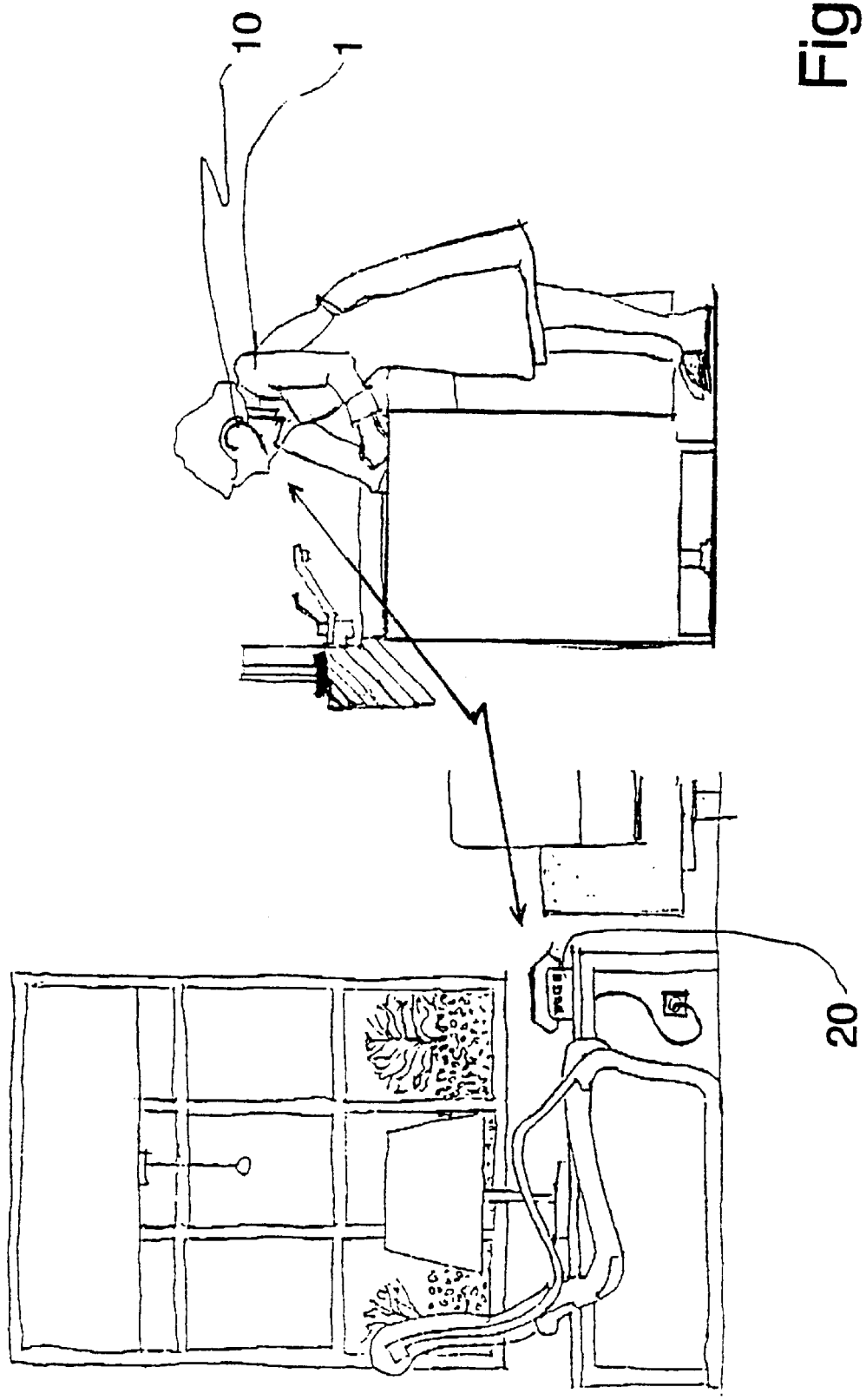

HEADSET AND METHOD FOR A HEADSET

The present invention relates to a combined microphone-speaker means or headset means to be used eg. in connection with telephones, announcement devices, speaker devices or paging devices, or in connection with two-way radio equipments or similar communications systems, and especially to a microphone-speaker arrangement adapted to be adjusted in accordance with the personal characteristics and likings of the user The invention relates further to a method for making a microphone-speaker device.

Various microphone-speaker combinations enabling two-way speech connection or similar are known. For the purpose of clarity and simplicity this kind of structure will in the following be called as a headset or a headset means.

It is already prior known to arrange different headsets, such as a headset for a telephone, to be supported by the auricle. Examples from such headset devices has been disclosed by U.S. Pat. Nos. 4,273,969, 4,864,610 and 5,210,792. All these disclose a headset design which is of essentially rigid structure from all parts thereof. The headset comprises a preshaped rigid supporting portion, which is to be mounted behind the ear, from which a speaker portion intended to be mounted in the ear orifice and which is covering/blocking the orifice is extending, and a rigid microphone supporting boom extending towards the mouth.

A disadvantage of the disclosed solutions has been that they are not adjustable according to the personal needs of the user. The constructions are essentially big in size and heavy in weight, and thus uncomfortable to use. In addition to that, they have not proven to be such that they would stay in their mounted position, ie. they will not remain in a position as they are mounted behind the ear, but tend to slip and/or to turn in a undesired manner. In addition, these devices block the other one of the ear orifices and thus will prevent the user of hearing anything else than the sound coming from the speaker by this ear, which is not desirable in all occasions. A disadvantage is also caused by the fact that it has not been possible or easy and pleasant to use glasses, helmet or headgear or similar means which are to be held close to the ear when using the devices according to said citations.

FI Utility Model No. 2020, in turn, shows a boom structure of a headset in which a part of the short portion intended to be placed behind the auricle in the top portion thereof may be understood as being individually deformable. The part of the headset boom extending behind the top portion of the auricle branches in front of the auricle into two separate branches. Another one of these including a speaker is placed into the ear orifice and the other one is extending towards the mouth. A relatively long portion extends backwards behind the ear. However, the operation and function of this is not explained in detail by the description of said publication. Neither does the publication disclose any such technique, by means of which the design according to the figures thereof could be realized.

The arrangement according to said FI Utility Model 2020 does not solve, or solves only partially, the above disclosed problems of the prior art. For instance, it does not overcome the problem in the poor stability of the headset behind the ear as it does not provide any design which could provide a proper supporting/holding effect, which would effect to the boom of the headset from several directions such that the device could be prevented from falling down and/or turning around the ear. Instead, according to the solution disclosed therein, the headset boom is supported by the auricle only for a short distance, ie. a length of about two centimeters only. If the microphone branch of the device were longer than what is shown, the device would not stay behind the ear in conditions in which the head has to be turned or moved quickly due to the short supporting portion of the boom behind the ear. No means are disclosed by the citation, which could prevent the movement of the headset means upwards to the ear. Thus the headset according to said citation would easily drop off from the top of the ear if the head is in a position in which it is downwardly turned or due to a rapid downward movement of the head, or at least the headset would turn to a position in which it cannot be used.

Even in this prior art solution the speaker portion of the headset covers or blocks the auditory meatus of the ear and thus prevents listening anything else than the speaker. In addition, the microphone will remain essentially too long apart from the mouth of the user and is also poorly positioned in view of the motion of the sound waves. Furthermore, the device cannot be used in connection with spectacles or different helmet types etc. head gear. The adjustment range of the device is limited, and in practice it is not possible to adjust the position of the microphone at all. A further disadvantage lies in the difficult and costly manufacture of the branch structure thereof.

The object of this invention is to overcome the disadvantages of the prior art and to provide a totally new type of solution for adjustable headset means intended to be mounted such that they are held by the ear. The solution according to the invention provides an adjustable headset means and a method for mounting the same, which has a simple and light design and is essentially slender from the size and appearance thereof and essentially more convenient to use than the known solutions.

It is also an object of the present invention to provide a headset means and a method for mounting the same which provides an essentially good stability behind the auricle but which, however, does not disturbingly bear against the auricle or other parts of the head of the user.

It is also an object of the present invention to provide a headset means and a method for mounting the same by means of which the headset means does not become essentially visible from behind the auricle.

It is a further object of the present invention to provide a headset means and a method for mounting the same in which the position of the microphone portion can be easily adjusted relative to the mouth of the user.

It is a further object of the present invention to provide a method and a device by means of which an easier use of other possible means used in close connection with the head, such as glasses, helmets, headgears etc., is enabled at the same time with the headset means.

It is also an object of the invention to provide a method and a means realizing the same by means of which a headset means enabling good hearing and speaking connection can be mounted in connection with the head of the user in a most invisible manner.

It is also an object of the present invention to provide a method and a means realizing the same in which there is no need for the blocking of the ear channel by the speaker means and which thus enables the user to observe the surroundings with the same ear in connection which the headset means has been mounted to.

The present invention is based on the idea that by providing a boom structure of a headset means from an essential flexible or deformable and elongatedly extending structure, said elongated boom structure including a speaker means at one end thereof and a microphone means at the other end, a headset means and a method is provided which realizes the above set forth objects.

According a preferred embodiment of the invention the headset means is comprising essentially elongated boom means adapted to be of essentially deformable structure. A microphone means is mounted at or closely adjacent to a first end of said elongated deformable boom means and a speaker means is mounted at or closely adjacent to another end of said elongated deformable boom means. The arrangement is such that said elongated deformable boom means provides a selectively deformable ear loop portion which can be adjusted to custom fit individual forms of an auricle of a user. Communication interface means are operationally connected to the microphone means and the speaker means for transmitting a voice signal. Said communication interface means may be combined with transceiver terminal means or they may be operationally connected to transceiver terminal means positioned spaced apart from the headset. Said transceiver terminal means are adapted to enable a voice signal traffic between said transceiver terminal means and at least one another terminal means.

In this context it is to be noted that by the term 'transceiver terminal means' it is intended to mean such transceiver means which may be used as a link for the actual voice transmitting system, such as a public switched telephone network (PSTN) or similar through, for instance, a mobile telephone or station or a fixed line telephone etc. Therefore said at least one another terminal means is to be understood as an interface to a public switched telephone network, such as a telephone terminal of a fixed telephone network or a mobile station of a mobile network or a base station of a mobile network.

In case of the combined communication interface and transceiver terminal means, they are preferably mounted in connection with and even within said elongated deformable boom means forming the headset means. Said transceiver terminal means are arranged to provide an air interface between said headset means and said at least one another terminal means.

In case said transceiver terminal means are mounted spaced to said elongated deformable boom means forming the headset means, an air interface is provided between said communication interface means included in said headset means and said transceiver terminal means.

According to one alternative the elongated deformable boom means is arranged to be adjustable from the length thereof.

The frame structure of said deformable boom means may be of suitable rubber material, plastic material or silicone material or of similar suitable elastic material. A portion of metallic material or of plastic material may be provided in connection with said elastic material of the frame structure of the boom means.

The headset means according to the present invention may further include antenna means arranged in connection with the frame structure of said deformable boom means, and preferably as a part thereof.

A method for a headset means including a microphone means and a speaker means comprises the steps for mounting an essentially elongated boom means including the microphone means mounted at or closely adjacent to a first end of said elongated deformable boom means and the speaker means mounted at or closely adjacent to another end of said elongated deformable boom means to extend around an auricle of a user such that said elongated deformable boom means is selectively adjusted to custom fit individual forms of said auricle of the user so as to provide an ear loop, transmitting a voice signal through communicating interface means operationally connected to the microphone means and the speaker means, said communication interface means being combined with transceiver. terminal means or operationally connected to transceiver terminal means, said transceiver terminal means enabling a voice signal traffic between said transceiver terminal means and at least one another terminal means.

Several advantages are obtained by means of the present invention. A headset means according to it is light in weight and slender from the design, but still provides an essentially good stability and will stay in the mounted position thereof also in conditions, in which the position of the head has to be rapidly turned and even in conditions, in which the head is in a downwardly or sideways turned position. The headset means is easy to mount and adjust to correspond the personal characteristics of each user. The adjustment of a suitable distance and position of the microphone means thereof is easy and quick to perform. It is no longer necessary to mount the speaker portion of the headset means into the ear orifice of the user so as to secure the general stability of the device, whereby the use thereof is made more pleasant and it does not prevent the user from listening the other surrounding voices by that ear. For instance, when using in a vehicle the device according to the present invention gives remarkable advantages due to the lightness, good stability, unnoticeable design and properties enabling the hearing by that ear thereof. A further advantage is provided by the general simplicity of the design, which results to an easy manufacture and low total costs of the headset means according to the present invention, as well as to a design which is easy to keep clean.

In the following the invention and the other objects and advantages thereof will be described by way of an example with reference to the annexed drawings, in which similar reference characters throughout the various figures refer to similar features. It should be understood that the following description of an example of the invention is not meant to restrict the invention to the specific forms presented in this connection but rather the present invention is meant to cover all modifications, similarities and alternatives which are included in the spirit and scope of the invention, as defined by the appended claims. It is further noted in this context that term headset means is intended to mean all such devices, constructions and solutions which are intended for receiving of voice and for forwarding the speech of the user. The term speaker means covers all such means suitable for reproducing voice which can be mounted in connection with one end of the boom means according to the present invention.

FIG. 1 discloses one embodiment according to the present invention.

FIG. 2 discloses as a schematic sectional view an embodiment of a headset according to the present invention.

FIG. 3 discloses as a schematic view one another embodiment of the present invention.

FIGS. 4a, 4b and 4c disclose still one another embodiment of the present invention in two positions thereof.

FIG. 5 discloses transmitter/receiver means according to one embodiment.

Figure 6:
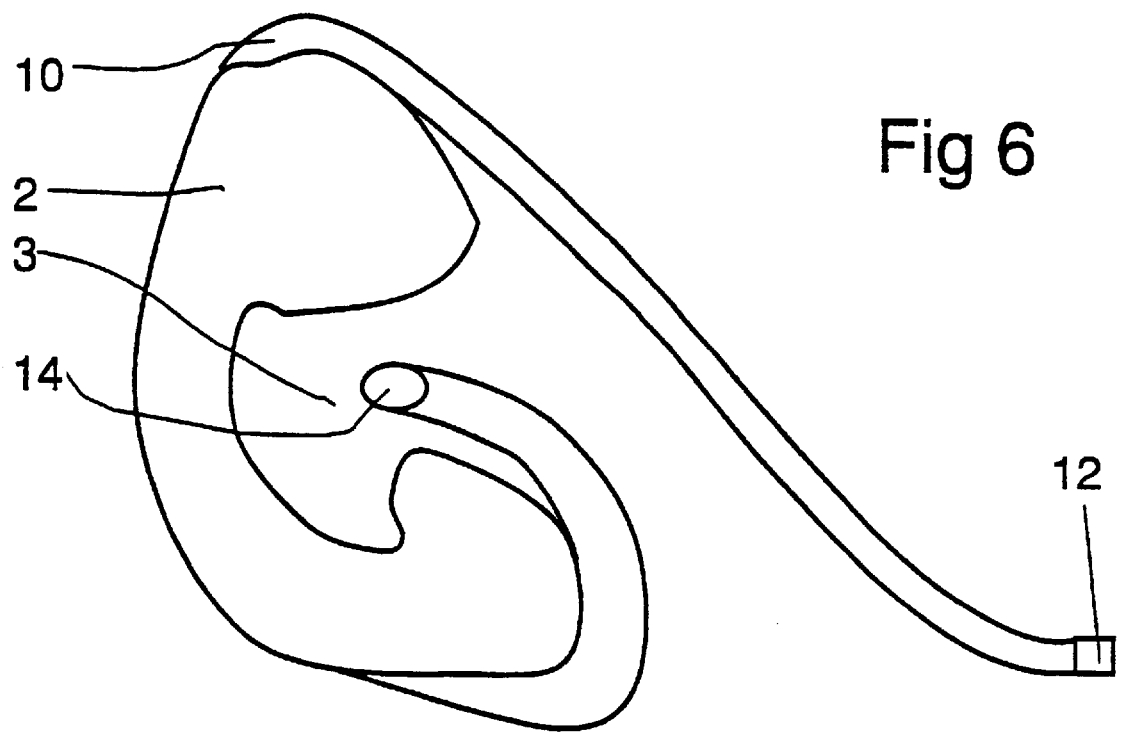

FIG. 6 discloses an alternative for FIG. 1.

Figure 7:
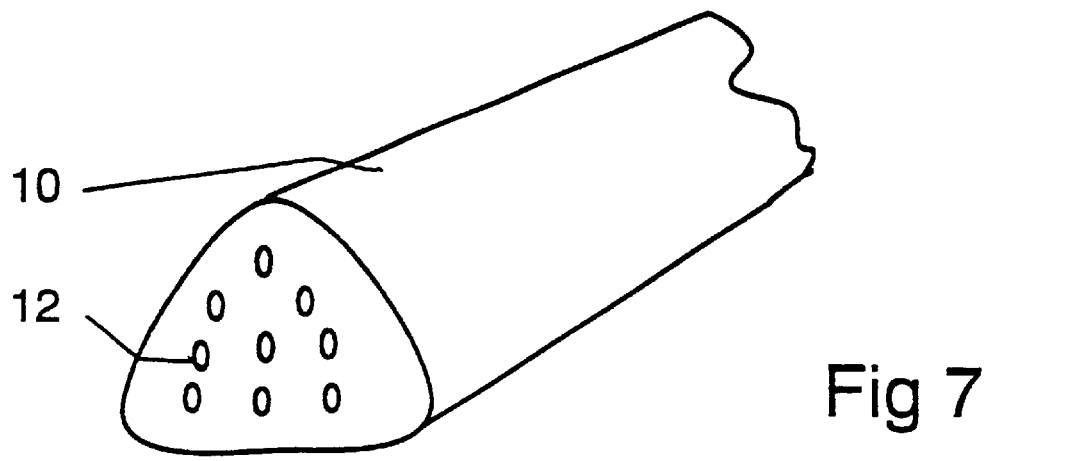

FIG. 7 discloses a still further embodiment.

FIG. 8 discloses a use of the headset means according to the present invention.

FIG. 1 discloses a general view of one preferred embodiment of the present invention in which a headset means according to the present invention has been placed behind an auricle 2 of an user 1. Said headset means is constructed from a frame structure 10 of essentially flexible or deformable material, which is bent to essentially extend around the whole auricle 2 such that the arm portion 11 supporting the microphone 12 in the end part thereof extends from below the auricle 2 towards the mouth 4 of the user 1. In a similar manner, the arm portion 9 including a speaker means 14 in the end thereof extends from above and front side of the auricle 2 in a close proximity to the ear orifice 3.

A separate receiver/transmitter ie. transceiver device 20 is also shown, which can be placed, for instance, into a pocket of the user 1. Device 20 is adapted to operationally connect the headset means of the invention to that system in which speech etc. voice is transmitted in general, such as to normal fixed wired telephone network, mobile telephone network, in-house telephone network, radio network, paging or guidance system etc. system delivering voice messages. The apparatus 20 can be eg. an operational internal part of a mobile telephone or of a cordless telephone. The apparatus can also be a separate part which is otherwise operationally connected to a suitable telephone equipment or similar communications apparatus. It is also to be noted that even though FIG. 1 discloses a cordless connection between the apparatus 20 and the headset 10, this connection can be arranged with a wire without departing from the spirit of the inventional idea.

As can be seen from FIG. 1 (or 6), the arm 10 of the headset means is arranged to essentially extend around the whole auricle 2 and such that it does not come essentially out or visible beyond the auricle 2. By this an essential advantage is obtained eg. in that the headset means will become well and solidly supported by the auricle 2. In addition, as the device is close-fitting the auricle, it will not effect disadvantageously to the use of other devices, such as glasses or hats etc., coming close to the ear, and will be "hidden" from the major part from the length thereof behind the auricle.

FIG. 2 is a sectional side view of the arm portion 10 of the headset means in a straightened position thereof for better disclosure of the technical details thereof. According to this embodiment the frame portion 10 is coated by a suitable elastic plastic, silicon or rubber material 13 or similar, which maintains the set shape thereof. The frame portion 10 consists of a pipe-like part having an essentially circular shape and being formed of a net-like structure 15, wherein a cavity or space is provided therein. The net-like structure 15 enables the bending of the frame portion 10, and in some occasions also the stretching of the same, in a desired manner, while the plastic or rubber material 13 or similar used as a covering adjusts accordingly and maintains the shape bent to the boom means 10. The space may include the required transmitter/receiver means 18, current ie. power source means, such as a battery, and possible antenna means 19. In the example the net-like means 15 is arranged to operate as an antenna means as well.

According to an alternative disclosed in FIG. 3 the headset 10 comprises a wire means 30, which is of suitable flexible and thereof bent shape preserving material, such as a metal wire containing lead or tin, wire of suitable plastic material or similar wire or cable material or woven material, inside the boom thereof or in connection thereof. Deformable dolls is given as an example of such per se known flexible and shape preserving structure. These comprise a solution enabling the bending of the limbs and body thereof, which solution can be directly utilized in the present invention. Another example are so called curve rulers which are deformable and maintain the bent shape thereof, and by means which it is possible to draw and/or copy figures having freely curved shapes. The skilled person understands the mechanism used in these, which is based on a suitable spring and hinge structure, and thus they are not explained in more detail herein.

In the example of FIG. 3, the reinforcement wire 30 is also utilized when arranging, an operational connection between the microphone means 12, ear piece means 14 and transmitter/receiver 18.

As is disclosed in FIGS. 4a . . . c, the arm portion of the headset means may include a bellows like part 32, which enables the adjustment of the length thereof in a desired manner. The bellows like part may in the simplest form be a corresponding structure to a bellows portion of a drinking straw, but it may be provided by any other appropriate manner, such as by means of metal or plastic wire wound to form a spiral or by means of a spring. The bellows like part may extend over only a portion of the length of the headset means, such as only over parts which require deforming and/or stretching.

In FIG. 4a the headset means is shown as in an extended position thereof. In FIG. 4b the corresponding means is in a shortened position thereof. According to this solution the whole boom of the headset means is formed from a bellows like frame means enabling the bending as well as adjustment of the length.

FIG. 4c is otherwise similar to FIG. 4a, but according to it a bigger transmitter/receiver apparatus 18, which might be necessary in some occasions, has been placed inside the headset means.

FIG. 5 discloses in more detail one apparatus by means of which it is possible to arrange the device according to the present invention to receive and to reproduce and to transmit spoken messages. A power source 17 is connected to the transmitter/receiver means 18. In addition, an amplifier 18' and antenna means 19 are shown. One end of the apparatus is provided with microphone means 12 and the other end is provided with speaker means 14.

FIG. 6 discloses an alternative way to FIG. 1 for positioning the headset means 10 relative to the auricle 2. In this the speaker means 14 extends from behind and below and finally from front of the auricle to a close proximity to the ear orifice 3. Correspondingly, the arm portion supporting the microphone 12 extends from above the ear 2 towards the mouth.

FIG. 7 shows one further example in which the shape of the headset means is differs from the essentially round shape described above. The advantage of the disclosed shape is that it can be pushed in a more deep position and closer to the base of the auricle, ie. it will position more deeper relative to the auricle in the back and top portions thereof. It is to be noted that even other shapes are possible.

FIG. 8 is one example of the use of the present invention. A telephone 20 is connected to a public switched telephone network (PSTN) in a manner per se known to the skilled person. Said telephone is further equipped with terminal means to be able to communicate with the transceiver terminal means of the headset means 10 of the invention as the user 1 is performing other activities, such as washing dishes. It is to noted that this is only one example of possible use and that the headset means according to the present invention is also suitable to be used in a number of other applications, such as inside a vehicle when motoring, in offices, workshops, public areas and so on, ie. everywhere where the advantageous properties and benefits of the invention can be utilized.

Therefore, the present invention provides an apparatus and a method, by means of which the usability and convenient use of a telephone device or a similar communication device are greatly improved. The apparatus is simple as its construction and economical to manufacture.

It is to be noted that the above examples are not intended to limit the spirit and scope of the present invention defined by the appended claims. For example, it is obvious for a skilled person, after having studied the above description together with the drawings, that the type and form of the microphones and speakers may essentially differ from those described and shown.

What is claimed is:

1. A headset having a microphone and a speaker comprising:

an essentially elongated boom, having a deformable structure, wherein the microphone is mounted at or closely adjacent to a first end of said elongated deformable boom and the speaker is mounted at or closely adjacent to another end of said elongated deformable boom and said speaker is arranged to be placed in a close proximity to an ear orifice and designed from the size and shape thereof such that the ear orifice does not become blocked by the speaker, whereby the user is allowed to listen also other surrounding voices by that ear, said elongated deformable boom provides a selectively deformable ear loop portion which is adjusted to custom fit individual forms of an auricle of a user, communication interface operationally connected to the microphone and the speaker for transmitting a voice signal, said communication interface being combined with transceiver terminal means or operationally connected to transceiver terminal, said transceiver terminal means being adapted to enable a voice signal traffic between said transceiver terminal means and at least one another terminal means.

2. A headset according to claim 1, wherein said combined communication interface means and transceiver terminal means are mounted in connection with said elongated deformable boom forming the headset wherein said transceiver terminal means are arranged to provide an air interface between said headset and said at least one another terminal means.

3. A headset according to claim 1, wherein said transceiver terminal means are mounted spaced to said elongated deformable boom forming the headset wherein an air interface is provided between said communication interface means included in said headset and said transceiver terminal means.

4. A headset according to claim 1 wherein said at least one another terminal means is an interface to a public switched telephone network.

5. A headset according to claim 1, wherein said elongated deformable boom is adjustable lengthwise.

6. A headset according to claim 1, wherein the frame structure of said deformable boom is comprised rubber material, plastic material, silicone material, or elastic material.

7. A headset according to claim 6, wherein the frame structure of the elongated deformable boom comprises a portion of metallic material or of plastic material in connection with said elastic material (elongated deformable).

8. A headset according to claim 1, further comprising an antenna arranged in connection with the frame structure of said deformable boom.

9. A headset according to claim 1, further comprising an energy source.

10. A method for making a headset including a microphone and a speaker, comprising steps of:

mounting an essentially elongated boom including the microphone disposed at or closely adjacent to a first end of said elongated deformable boom, and the speaker disposed at or closely adjacent to another end of said elongated deformable boom to extend around an auricle of a user such that said elongated deformable boom is selectively adjusted to custom fit individual forms of said auricle of the user so as to provide an ear loop, placing said speaker in a close proximity to the ear orifice such that the ear orifice does not become blocked by the speaker, whereby the user is allowed to listen also other surrounding voices by that ear, transmitting a voice signal through communicating interface means operationally connected to the microphone and the speaker, said communication interface means being combined with transceiver terminal means or operationally connected to transceiver terminal means, said transceiver terminal means enabling a voice signal traffic between said transceiver terminal means and at least one another terminal means.

11. A method according to claim 10, wherein said combined communication interface means and transceiver terminal means are mounted in connection with said elongated deformable boom forming the headset and are providing an air interface between said headset and said at least one another terminal means.

12. A method according to claim 10, further comprising a step for adjusting the length of the elongated deformable boom.

* * * * *